US009031084B2

(12) United States Patent
Olsen

(10) Patent No.: US 9,031,084 B2
(45) Date of Patent: May 12, 2015

(54) QUALITY OF SERVICE FOR STREAMS OVER MULTIPLE AUDIO VIDEO BRIDGING NETWORKS

(71) Applicant: Harman International Industries, Incorporated, Stamford, CT (US)

(72) Inventor: David Olsen, Kaysville, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 113 days.

(21) Appl. No.: 13/840,599

(22) Filed: Mar. 15, 2013

(65) Prior Publication Data

US 2014/0022938 A1 Jan. 23, 2014

Related U.S. Application Data

(60) Provisional application No. 61/674,107, filed on Jul. 20, 2012.

(51) Int. Cl.
*H04L 12/56* (2006.01)
*H04L 29/06* (2006.01)
(Continued)

(52) U.S. Cl.
CPC ........ *H04L 29/06333* (2013.01); *H04L 12/462* (2013.01); *H04L 65/1006* (2013.01); *H04L 65/80* (2013.01); *H04L 47/806* (2013.01); *H04L 47/724* (2013.01); *H04L 47/781* (2013.01); *H04L 47/801* (2013.01); *H04L 47/805* (2013.01); *H04L 65/1069* (2013.01); *H04L 65/1073* (2013.01); *H04L 65/1083* (2013.01)

(58) Field of Classification Search
CPC ........................... H04L 47/724; H04L 12/462
USPC .................................. 370/401, 252, 253, 254
See application file for complete search history.

(56) References Cited

U.S. PATENT DOCUMENTS

2002/0181462 A1 12/2002 Surdila et al.
2009/0049175 A1* 2/2009 Finn .............................. 709/226
(Continued)

FOREIGN PATENT DOCUMENTS

WO 2006124790 A2 11/2006

OTHER PUBLICATIONS

J. Polk, et al., "Quality of Service (QoS) Mechanism Selection in the Session Description Protocol (SDP)", https://tools.ietf.org/html/rfc5432, Mar. 2009.
(Continued)

*Primary Examiner* — Gary Mui
(74) *Attorney, Agent, or Firm* — Alleman Hall McCoy Russell & Tuttle LLP

(57) ABSTRACT

A network communication system includes a network node that is configured to create and terminate sessions between talkers and listeners connected to different Layer 2 networks. The talkers and listeners may be configured to reserve network paths and communicate data streams in accordance with a Layer 2 reservation protocol, such as Stream Reservation Protocol. The talkers and listeners in the different Layer 2 networks may reserve network paths and communicate data streams through a network node configured to manage sessions using a Layer 3 session protocol, such as Session Initiation Protocol. The network node may reserve the network paths and enforce quality of service in accordance with the Layer 2 reservation protocol so that the talkers and listeners in the different Layer 2 networks may communicate data streams to each other.

20 Claims, 3 Drawing Sheets

(51) Int. Cl.
  *H04L 12/46* (2006.01)
  *H04L 12/913* (2013.01)
  *H04L 12/927* (2013.01)
  *H04L 12/911* (2013.01)

(56) References Cited

U.S. PATENT DOCUMENTS

2011/0038381 A1* 2/2011 Oren et al. .................... 370/401
2012/0314597 A1* 12/2012 Singh et al. ................... 370/252

OTHER PUBLICATIONS

European Patent Office, International Search Report and Written Opinion of PCT/US2013/051282, Netherlands, Oct. 8, 2013, 14 pages.

Le Faucher, F. et al., "Resource Reservation Protocol (RSVP) Proxy Approaches", Internet Engineering Task Force (IETF); Oct. 11, 2010, 51 pages.

Goulart, Ana Elisa P., et al., "On Overlapping Resource Management and Call Setup Signaling: A New Signaling Approach for Internet Multimedia Applications", Computer Communications, vol. 28, Dec. 16, 2004, 13 pages.

* cited by examiner

QUALITY OF SERVICE FOR STREAMS OVER MULTIPLE AUDIO VIDEO BRIDGING NETWORKS

CROSS REFERENCE TO RELATED APPLICATION

This application claims the benefit of U.S. Provisional Application No. 61/674,107, filed Jul. 20, 2012. The contents of U.S. Provisional Application 61/674,107 are hereby incorporated by reference in their entirety.

BACKGROUND

1. Technical Field

This description relates to an Ethernet Audio-Video Bridging ("AVB") network, and more particularly to managing sessions and reservations over multiple AVB networks.

2. Background Art

Data streams including audio and/or video data may be communicated in a network communication system from one endpoint to another endpoint. Before the data stream is communicated, messages may be communicated to reserve network paths between the endpoints. The network paths may include bridges, which may guarantee and enforce quality of service that is established during reservation of the network paths.

SUMMARY

A network communication system includes a plurality of electronic devices connected in different Layer 2 networks, such as Audio-Video Bridging (AVB) networks that communicate data streams. The electronic devices may be configured to perform the roles of talkers and listeners. The talkers and listeners may be configured to reserve network paths for communication of data streams in accordance with a Layer 2 reservation protocol, such as Stream Reservation Protocol (SRP). The Layer 2 reservation protocol may also be used as a quality of service (QoS) mechanism when reserving the network paths, in which QoS parameters may be established and guaranteed for communication of the data streams. Layer 2 reservation messages generated in accordance with the Layer 2 reservation protocol may be communicated between the talkers and the listeners over Layer 2 bridges in the Layer 2 networks to reserve the network paths with guaranteed QoS.

When a talker in one Layer 2 network wants to communicate a data stream to a listener in a different Layer 2 network, the talker and listener may communicate with a network node, such as a router, configured to communicate with the different Layer 2 networks. The network node may be configured to create and terminate sessions during which a communication of a data stream occurs in accordance with a Layer 3 session management protocol, such as Session Initiation Protocol (SIP).

To create a session for a communication of a data stream through the network node, the talker may send a SIP INVITE message to initiate creation of the session. The INVITE message may include a stream identification (ID) for the data stream, a requested bandwidth at which to communicate the data stream, and information identifying the Layer 2 reservation protocol as a QoS mechanism to reserve the data paths and guarantee quality of service.

The network node may receive the INVITE message and identify the Layer 2 reservation protocol as the QoS mechanism. In response, the network node may determine whether the requested bandwidth is available over various network links or paths between the talker and the listener. If the requested bandwidth is available, the network node may reserve the bandwidth. In addition, the network node may send Layer 2 advertisement and ready messages to the talker and the listener and receive other Layer 2 advertisement and ready messages from the talker and the listener to complete the reservation.

SIP messages other than the INVITE message may be communicated between the talker, the listener, and the network node to negotiate session parameters and create the session. Some of the SIP messages, including those indicating that negotiation of QoS parameters and/or session parameters generally, may be sent in response to receipt of the Layer 2 advertisement and ready messages, which may be used to confirm that reservation of the network paths is complete.

To terminate the session, the talker may send a BYE message to the network node indicating that the session and communication of the data stream have ended. The network node may release the bandwidth that was reserved. In addition, the network node may send Layer 2 termination messages in accordance with the Layer 2 reservation protocol to the talker and the listener to tear down the network path reservations and make available resources allocated by the talker and listener to communicate the data stream. After the reservations are torn down, a SIP OK message may be communicated from the listener to the talker via the network node to complete termination of the session.

By being configured to handle both Layer 3 session (e.g., SIP) messages and Layer 2 reservation (e.g, SRP) messages, the talkers, listeners, and the network node in the communication system may be both SIP aware and SRP aware to enable communication of data streams between talkers and listeners connected in different Layer 2 networks. The data streams may be communicated through a network node configured for Layer 3 routing. In addition, the network paths over which the data streams may be communicated may be reserved with guaranteed quality of service during the session.

Other systems, method, features and advantages will be, or will become, apparent to one with skill in the art upon examination of the following figures and detailed description. It is intended that all such additional systems, method, features and advantages be included within this description, be within the scope of the description, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles described in the description. Moreover, in the figures, like referenced numerals designate corresponding parts throughout the different views.

DETAILED DESCRIPTION OF EMBODIMENTS

The present disclosure describes network communication systems that are configured to establish sessions for communication of data between endpoints over multiple layers where quality of service (QoS) may be guaranteed over the multiple layers. In a particular network communication system, endpoints in different Layer 2 networks or domains may communicate through a Layer 3 network node to establish a session to communicate data between each other. The session may be established with guaranteed QoS. The Layer 3 network node may guarantee the quality of service during the session between the endpoints by being configured to identify a Layer 2 QoS mechanism utilized by the endpoints during session setup.

Figure 1:
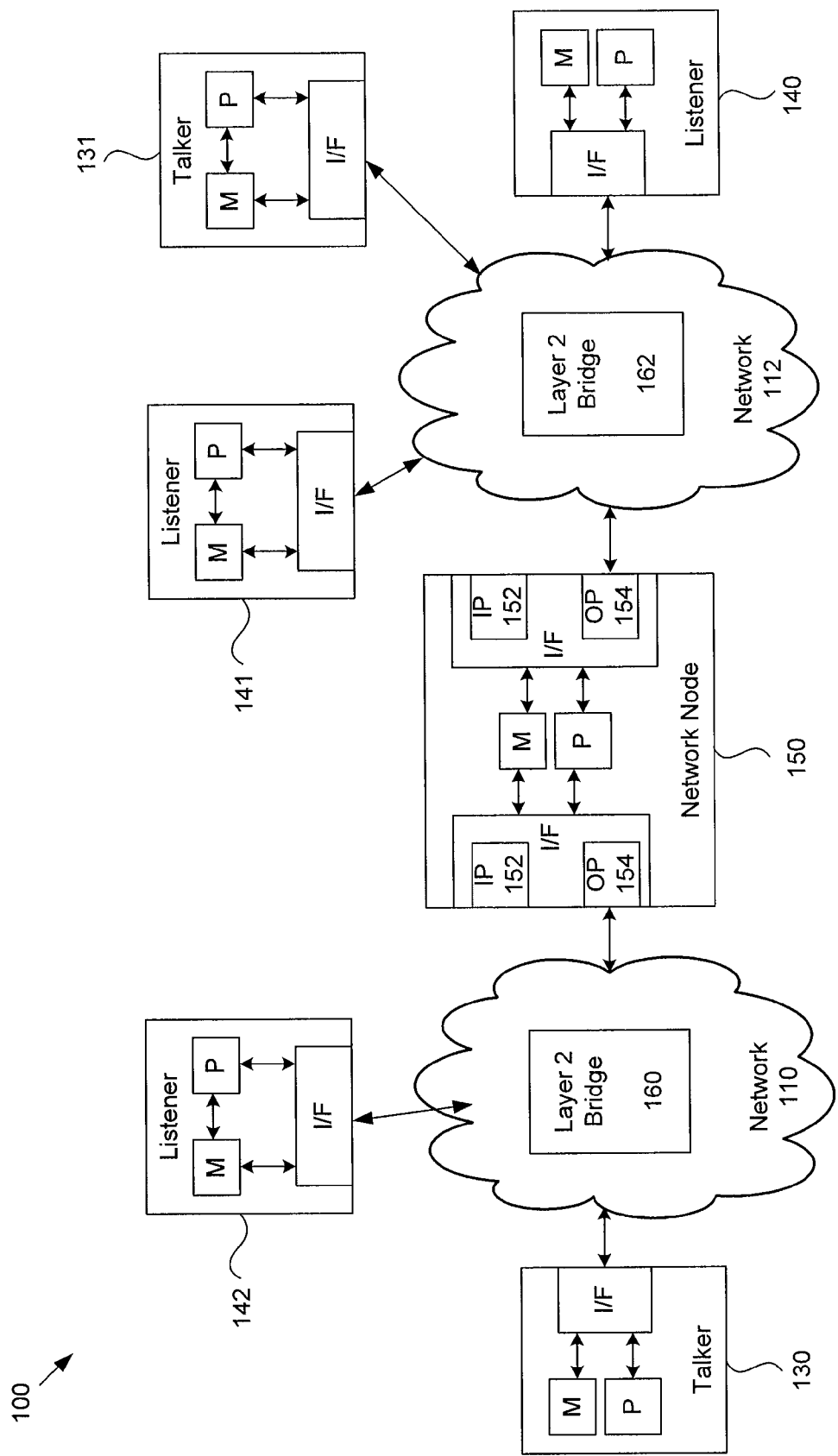
FIG. 1 is a block diagram of an example network communication system.

FIG. 1 shows a block diagram of an example network communication system 100. The network communication system 100 may include a plurality of electronic devices 130, 131, 140, 141, 142 configured to communicate streams of data, including audio and/or video data, over a plurality networks 110, 112. FIG. 1 shows five electronic devices, 130, 131, 140, 141, 142, although more or fewer devices may be included in the network communication system 100. In addition, at least one of the electronic devices, such as at least one of the electronic device 130, 142 may be connected to and configured to communicate data over a first network 110, and at least one of the electronic devices, such as at least one of the electronic devices 131, 140, 141, may be connected to and configured to communicate data over a second network 112.

Each of the electronic device 130, 131, 140, 141, 142 may be configured to perform one or more roles. The roles may include the role of a talker, the role of a listener, or some combination of the roles, such as a talker/listener. The role of the talker may be to transmit data across at least one of the networks 110, 112. In addition or alternatively, the role of the talker may be to establish, create, and/or reserve a connection or a data path for the transmission of a data stream carrying the data. In addition or alternatively, the role of the talker may be to terminate the reservation and/or remove or tear down the data path or connection. The role of the listener may be to receive the data that has been sent over at least one of the networks 110, 112. In addition or alternatively, the role of the listener may be to connect to and/or reserve connection to the data path for receipt of the data stream. In addition or alternatively, the role of the listener may be to remove connection from the network path and/or terminate receipt of the data stream.

The electronic devices 130, 131, 140, 141, 142 may be configured to switch between or change roles. Alternatively, the roles that the electronic devices 130, 131, 140, 141, 142 may be configured to perform may be fixed. For the following description, the electronic devices 130, 131 are configured as talkers, and the electronic devices 140, 141, 142 are configured as listeners. In an alternative communication network system, other roles may be designated. In addition, in an alternative system, there may be more or fewer talkers than the talkers 130, 131 and/or more or fewer listeners than the three listeners 140, 141, 142.

Each of the first and second networks 110, 112 may be configured in accordance with Layer 2 of the Open Systems Interconnection (OSI) model, in which routing and forwarding decisions or determinations in the networks 110, 112 may be performed on a media access control (MAC) addressing basis. An example Layer 2 network may include an Ethernet Audio/Video Bridging (AVB) network. For Layer 2 networks configured as AVB networks, the talker 130 and the listeners 140, 141, 142 may be configured to communicate over the AVB networks 110, 112 using various AVB standards and protocols, including the Institute of Electrical and Electronics Engineers (IEEE) 802.1AS-2011 (gPTP) for network timing and synchronization, IEEE 802.1Qav-2009 for queuing and forwarding streaming data, IEEE 802.1Qat-2010 (Stream Reservation Protocol (SRP)) for reserving data stream bandwidth in a network, and/or IEEE 1722-2011 related to a possible data streaming format. Other AVB-related standards and protocols may also or alternatively be used.

When the talkers 130, 131 determine to transmit a data stream, the talkers 130, 131 may be configured to advertise the transmission as a Layer 2 advertisement message. The Layer 2 advertisement messages may be transmitted to reserve and establish network paths over at least one of the Layer 2 networks 110, 112 for which the data stream may be communicated.

The talkers 130, 131 may be configured to determine one or more talker attributes to include in the Layer 2 advertisement messages. The talker attributes may identify characteristics about the talkers 130, 131 and/or the data stream being advertised to reserve and establish the network path. For example, the talker attributes may identify that the talkers 130, 131 want to transmit the data stream to one or more of the listeners 140, 141, 142. The talker attributes may also identify a type of the transmission, such as the transmission being a unicast, a multicast or a broadcast transmission, as examples. In addition or alternatively, the talker attributes may identify one or more destination addresses, such as Layer 2 or MAC destination addresses, to which to send the data stream. The destination addresses may be destination addresses of listeners in the network communication system 100, such as the listeners 140, 141, 142. In addition or alternatively, the destination addresses may be multicast destination addresses.

In addition or alternatively, the talker attributes may identify a unique stream identifier ("ID") for the advertised data stream. The stream ID may be a unique sequence of characters and/or numbers which may be assigned to only one data stream. For example, no two registered or reserved data streams may have the same stream ID.

In addition or alternatively, the talker attributes may identify one or more quality of service (QoS) parameters for and/or associated with transmission of the data stream. Quality of service may generally refer to an ability to provide or set different priorities to different transmission of data streams and/or to guarantee an identified level of performance for the transmissions. Various QoS parameters may be identified or have amounts that are determined or required for the different priorities and/or the levels of performance. Example QoS parameters may include bandwidth for transmission of the advertised data stream. Other QoS parameters may include propagation delay, bit rate, jitter, packet dropping probability, and/or bit error rate, as examples. Other QoS parameters may be included.

One or more of the listeners 140, 141, 142 may receive a Layer 2 advertisement message. If a listener receives the Layer 2 advertisement message, the listener may determine whether the listener wants to receive the data stream being advertised in the Layer 2 advertisement message. The listener may be configured to assign and/or identify the stream ID to determine whether the listener wants to receive the data stream. If the listener wants to receive the data stream, the listener may register or store the Layer 2 advertisement message and/or the talker attributes.

In addition, the listener may send a Layer 2 ready message, which may indicate that the listener requests to receive or attach to the data stream and/or that the listener is ready to receive the data stream. In some situations, the listener may send the Layer 2 ready message in response to receipt of the Layer 2 advertisement message. In other situations, the listener may send the Layer 2 ready message first without receipt of the Layer 2 advertisement message, such as where the talkers and listeners are configured for asynchronous communication.

The listener may determine one or more listener attributes to include the Layer 2 ready message. The listener attributes may be used to request receipt of the data stream being advertised by the talker. An example listener attribute may include the stream ID included in the Layer 2 advertisement message, which may be used to match or compare the stream ID included in the Layer 2 advertisement message and/or to compare the talker attributes and the listener attributes for reservation of the network path and transmission of the data stream.

The talker that sent the Layer 2 advertisement message may receive the Layer 2 ready message. In response, the talker may register or store the Layer 2 ready message and/or the listener attributes included in the Layer 2 ready message. In addition, when the talker receives the Layer 2 ready message, the reservation and/or establishment of the data path may be completed. The reservation may include a reservation for resources or QoS parameters, such as bandwidth, that were identified in the Layer 2 advertisement message. In some configurations, where multiple listeners sent multiple Layer 2 responses, multiple network paths may be reserved and established between the talker and the multiple listeners for transmission of the data stream.

Once a reservation for one or more network paths is complete and the Layer 2 advertisement and ready messages and associated talker and listener attributes are registered, the data stream may be communicated between the talker and the one or more listeners. After the communication of the data stream has ended, the talker and the one or more listeners may be configured to communicate Layer 2 termination messages to terminate the communication. In response to the Layer 2 termination messages, the reservations for the network paths may be terminated, the registrations of the Layer 2 advertisement messages, responses, and associated talker attributes may be de-registered, and any resources consumed for communication of the data stream may be made available for other communications of data streams.

The event during which communication of the data stream occurs may be referred to as a session or a media session, such as where the data includes audio data, video data, or some other type of media or multimedia data. An individual session may be identified by an availability to transmit the data stream, as determined by the establishment or reservation of the network paths for the communication of the data stream and any associated termination or tear down of the reservation or the network paths. Session creation and termination may be performed by communication of the Layer 2 advertisement, ready, and termination messages.

The talkers 130, 131 and the listeners 140, 141, 142 may be configured reserve network paths and resources for the data streams in the Layer 2 networks 110, 112 in accordance with one or more predetermined Layer 2 reservation standards or protocols. Under the Layer 2 reservation standard or protocol, the Layer 2 advertisement, ready, and termination messages may be generated, registered, and communicated. In addition, the Layer 2 reservation standards or protocols may provide a QoS mechanism to establish quality of service for the reservations and guarantee that the quality of service is achieved and maintained during the session. For AVB networks, the reservation protocol used to reserve network paths and guarantee QoS may be SRP. Under SRP, the Layer 2 advertisement messages generated by the talkers may be Talker Advertisement (TA) messages, and the Layer 2 ready messages generated by the listeners may be Listener Ready (LR) messages. In addition, the Layer 2 termination messages generated by the talkers may be Talker Advertisement Leave (TAL) messages, and the Layer 2 termination messages generated by the listeners may be Listener Ready Leave (LRL) messages, as described under SRP.

The talkers 130, 131 and the listeners 140, 141, 142 may be configured to communicate data streams and the Layer 2 advertisement and termination messages and associated responses over the networks 110, 112 through Layer 2 bridging. As shown in FIG. 1, each of the Layer 2 networks 110, 112 may include one or more Layer 2 bridges 160, 162. The Layer 2 bridges 160, 162 may be used to create and tear down the network paths by receiving and forwarding the Layer 2 advertisement, ready, and termination messages. In addition, the Layer 2 bridges 160, 162 may receive and forward data streams during sessions to next locations along the established network paths. Each of the Layer 2 bridges 160, 162 shown in FIG. 1 may represent a single bridge or a plurality of bridges, such as a bridging network or system, in the Layer 2 networks, 110, 112.

The Layer 2 bridges 160, 162 may be configured to guarantee and enforce quality of service for establishment of the network paths and transmission of the data streams during sessions. For example, the Layer 2 bridges may prevent establishment of network paths that are unable to handle a specified bandwidth. In addition, the Layer 2 bridges 160, 162 may enforce priority schemes or hierarchies for the data streams, such as by preventing lower priority data streams from disrupting communication of higher priority data streams during a session. Other guarantees or enforcements of quality of service may be possible.

The Layer 2 bridges 160, 162 may be configured to guarantee and enforce quality of service for communication of data streams in accordance with the predetermined reservation standard or protocol used to reserve the network paths and provide the QoS mechanism for the networks 110, 112. As an example, for SRP, in response to receipt of a TA message, if a bridge along a network path does not have sufficient bandwidth or resources available, the bridge may change a TA message to a Talker Failed (TF) message before forwarding it toward a listener. The TF message may indicate an advertisement for an unavailable data stream. Additionally, if one or more listeners want to attach to a data stream, but there is insufficient bandwidth or resources for transmission to at least one of the listeners, Listener Ready Failed (LRF) messages or Listener Asking Failed (LAF) messages may be communicated instead of LR messages. A LRF message may indicate that at least one but less than all of the listeners are unable to receive the data stream. A LAF message may indicate that all of the listeners are unable to receive the data stream.

The Layer 2 bridges 160, 162 may be capable of directly communicating the data streams and the Layer 2 advertisement, ready, and termination messages to electronic devices connected to the Layer 2 network in which the Layer 2 bridges 160, 162 are respectively configured. Here, direct communication may refer to communication from a bridge to a destination node or endpoint—such as another bridge, a talker, or a listener—without receipt or interception by another network node prior to receipt by the destination. For example, the one or more Layer 2 bridges 160 may be capable of directly communicating data streams and Layer 2 advertisement, ready and termination messages to the talker 130 and the listener 142 connected to the first Layer 2 network 110. Similarly, the one or more Layer 2 bridges 162 may be capable of directly communicating data streams and Layer 2 advertisement, ready and termination messages to the talker 131 and the listeners 140, 141 connected to the second Layer 2 network 112.

However, the Layer 2 bridges 160, 162 may be unable to directly communicate data streams and Layer 2 advertisement, ready and termination messages directly to bridges and electronic devices connected to a different Layer 2 network. For example, the one or more bridges 160 in the first Layer 2 network 110 may be unable to directly communicate data streams and Layer 2 advertisement, ready and termination messages to the one or more Layer 2 bridges 162 and/or the listeners 140, 141 connected to the second Layer 2 network 112. In addition, the one or more Layer 2 bridges 162 in the second Layer 2 network 112 may be unable to directly communicate data streams and Layer 2 advertisement, ready and termination messages to the talker 130 and the listener 142 connected to the first Layer 2 network 110.

As a result, where communication between the talkers and listeners 130, 131, 140, 141, 142 uses only Layer 2 bridging, creation and termination of sessions for communication of data streams between talkers and listeners may be limited to a single Layer 2 network or domain. That is, talkers and listeners connected to different Layer 2 networks or domains may be unable to establish sessions and communicate data streams during the sessions using only Layer 2 bridging.

The example network communication system 100 may include a network node 150, such as a router or an electronic routing device or apparatus, that may be configured to communicate with both of the Layer 2 networks 110, 112 so that the talkers and listeners 130, 131, 140, 141, 142 connected in different Layer 2 networks 110, 112 may create and terminate sessions of data stream communications with each other. The network node 150 may be configured to receive and transmit messages over the networks 110, 112, using one or more interfaces I/F. The interfaces I/F may include a plurality of ports, including ingress ports 152 and egress ports 154. The network node 150 may receive messages from over the networks 110, 112 on the ingress ports 152, and may transmit messages over the networks 110, 112 on the egress ports 154.

The network node 150 may be configured to perform various functions or operations for creation and termination of the sessions. For example, the network node 150 may be configured to communicate session messages over the Layer 2 networks 110, 112 to create and terminate the sessions and negotiate session parameters for the sessions. In addition, the network node 150 may be configured to handle and manage generation and communication of Layer 2 advertisement, ready and termination messages over both of the Layer 2 networks 110, 112. Also, the network node 150 may be configured to establish and/or reserve network paths between the network node 150 and a talker in one of the Layer 2 networks 110, 112, and between the network node 150 and one or more listeners in the other Layer 2 network 110, 112. Further, the network node 150 may be configured to perform bandwidth determinations for the network paths. For example, the network node 150 may be configured to determine whether a requested bandwidth for transmission of a data stream is available in a network path. In addition, the network node 150 may be configured to allocate and/or reserve the requested bandwidth for transmission of the data stream over the network path. The network node 150 may also be configured to monitor and/or manage active data streams being communicated over the different layer 2 networks 110, 112. In addition or alternatively, the network node 150 may be configured to ensure that quality of service is achieved and maintained during establishment of the network paths and communication of the data streams.

For some example configurations, the network node 150 may be configured for Layer 3 of the OSI model, in which routing and forwarding determinations may be performed on an Internet Protocol (IP) addressing basis. As a Layer 3 networking device, the network node 150 may be configured to manage sessions for communications of data streams in accordance with Layer 3. In particular, the Layer 3 network node 150 may be configured to create, modify, and terminate sessions using and/or in accordance with a Layer 3 session management standard or protocol. An example Layer 3 session management protocol is Session Initiation Protocol (SIP). The network node 150 may be configured to generate Layer 3 session management messages and communicate the messages to the talkers and listeners 130, 131, 140, 141, 142 over the Layer 2 networks 110, 112. In order to communicate with the network node 150 to create and terminate sessions, the talkers and listeners 130, 131, 140, 141, 142 may be configured to communicate session management messages in accordance with the same Layer 3 session management protocol as the network node 150, such as SIP.

The following description describes communication between the network node 150 and talkers and listeners connected to different Layer 2 networks 110, 112 to establish and terminate a session for communication of a data stream over the different Layer 2 networks 110, 112. Particular reference is made to communication with the talker 130 in the first Layer 2 network 110 and the listener 140 in the second Layer 2 network 112. However, the description may equally apply to session creation and termination between different talkers and listeners, such between the talker 131 and the listener 142, and/or between a talker and multiple listeners, such as the talker 130 and the listeners 140, 141. In addition, hereafter, session management, creation, modification, and termination is described as being performed in accordance with SIP and its associated messages, although other Layer 3 session management protocols, either currently existing or later developed, are contemplated.

To initiate creation of a session, the talker 130 may be configured to transmit an INVITE message to the network node 150. The INVITE message may indicate that the talker 130 wants to create a session for transmission of a data stream and that listener 140 is being invited to participate in the session. The INVITE message may include session parameters for the session. The session parameters may include information or properties about the data stream and/or content of the data (e.g., a media type) and codec information. The session parameters may also include information identifying the Layer 2 reservation standard or protocol used to reserve the network paths and/or provide the QoS mechanism for the network paths. The session parameters may also include information identifying one or more QoS parameters, such as a requested bandwidth to be reserved for transmission of the data stream over the network path. In addition, the INVITE message may include a stream ID associated with and identifying the data stream. The stream ID may be the same stream ID included as a talker attribute for the Layer 2 stream advertisements messages, as previously described.

The network node 150 may receive the INVITE message from the talker 130, such as on one of its ingress ports 152. In response to receipt of the INVITE message, the network node 150 may identify the Layer 2 reservation protocol being specified. Following identification, the network node 150 reserve and/or establish network paths between the network node 150 and the talker 130 and between the network node 150 and the listener 140. The network paths may be established in accordance with the Layer 2 reservation protocol specified in the INVITE message.

In further detail, in response to identification of the Layer 2 reservation protocol, the network node 150 may determine whether sufficient bandwidth is available for transmission of the data stream identified in the INVITE message. The network node 150 may perform the determination for three network paths or three portions of a complete network path between the talker 130 and the listener 140, including a network path between the talker 130 and an ingress port 152 of the network node, a network path between the ingress port 152 and an egress port 154, and a network path between the egress port 154 and the listener 140. If sufficient bandwidth is available, the network node 150 may be configured to reserve the bandwidth requested in the INVITE message to establish the complete network path between the talker 130 and the listener 140.

After reserving the requested bandwidth, the network node 150 may be configured send a Layer 2 ready message to the talker 130 and send a Layer 2 advertisement message to the listener 140 to perform attribute registration in accordance with the Layer 2 reservation protocol identified in the INVITE message. In this way, the network node 150 may function as talker and listener proxies for the talker 130 and the listener 140 so that Layer 2 advertisement and ready messages may be communicated to both the talker 130 and the listener 140. That is, the network node 150 may function as a listener proxy for the listener 140 by performing the role of a listener and communicating with the talker 130. In addition, the network node 150 may function as a talker proxy for the talker 130 by performing the role of a talker and communicating with the listener 140.

The network node 150 may further be configured to receive a Layer 2 advertisement message from the talker 130 and a Layer 2 ready message from the listener 140. For some example configurations, the talker 130 may be configured to send the INVITE message before sending the Layer 2 advertisement message, or may send the INVITE message and the Layer 2 advertisement message simultaneously or substantially simultaneously. In addition, the listener 140 may be configured to send the Layer 2 ready message in response to receipt of the Layer 2 advertisement message transmitted by the network node 150. However, in other example configurations, the talker 130 and the listener 140 may be asynchronous devices, in which case the Layer 2 advertisement message may be sent by the talker 130 prior to transmission of the INVITE message, and/or the Layer 2 ready message may be sent by the listener 140 without first receiving a Layer 2 advertisement message. In the event that the network node 150 receives a Layer 2 advertisement message from the talker 130 without having received the INVITE message, the network node 150 may be unable to handle or process the received Layer 2 advertisement message because the network node 150 did not first identify the Layer 2 reservation protocol included in the INVITE message under which the Layer 2 advertisement message was generated. Similarly, the network node 150 may be unable to handle or process a received Layer 2 ready message from the listener without first receiving the INVITE message.

Assuming that the network node 150 has identified the Layer 2 reservation protocol, the network node 150 may be able to process a received Layer 2 advertisement message from the talker 130 and process a received Layer 2 ready message from the listener 140. In response to receipt of both the Layer 2 advertisement message from the talker 130 and the Layer 2 ready message from the listener 140, the network node 150 may be configured to notify the talker 130 that the session is created (e.g., the requested bandwidth is reserved) and that the talker 130 may begin transmission of the data stream. As previously described, the Layer 2 bridges 160, 162 may be configured to guarantee that sufficient bandwidth is available for transmission of the data stream. If there is not sufficient bandwidth, then the bridges 160, 162 may change the Layer 2 advertisement and ready messages to a Layer 2 failed messages. As such, receipt of both the Layer 2 advertisement message and the Layer 2 ready message by the network node 150 may indicate to the network node that the Layer 2 bridges 160, 162 have reserved sufficient bandwidth for transmission of the data stream. To ensure that the network node 150 does not notify the talker 130 to begin transmission of the data stream without knowing that the Layer 2 bridges 160, 162 have reserved sufficient bandwidth, the network node 150 may be configured to withhold notification to the talker 130 until the network node 150 receives both a Layer 2 advertisement message from the first Layer 2 network 110 and a Layer 2 ready message from the second Layer 2 network 112.

After the network node 150 notifies the talker 130 that the session may begin, the taker 130 may transmit the data stream to the network node 150, and the network node 150, and the network node 150 may forward the data stream to the listener 140. The data stream may be packetized in any packet format and/or in accordance with any various standards or protocols, including Real-time Transport Protocol (RTP), Transmission Control Protocol (TCP), and/or User Datagram Protocol (UDP), as examples. Where RTP is used, the session may be referred to as a RTP session.

When the session is complete, the talker 130 may be configured to transmit a SIP termination message, such as a BYE message, to the network node 150, indicating to the network node 150 that the session has ended. In response, the network node 150 may be configured to release any bandwidth that was reserved for the session, including any bandwidth allocated for the network path in between the talker 130 and the ingress port 152, between the ingress port 152 and the egress port 154, and the egress port 154 and the listener 140. Also, the network node 150 may be configured to send Layer 2 termination messages to the talker 130 and the listener 140, which may deregister any registered talker attributes. After the Layer 2 termination messages are sent, the network node 150 may be configured to notify the talker 130 that the reservation and/or the session is terminated.

Figure 2:
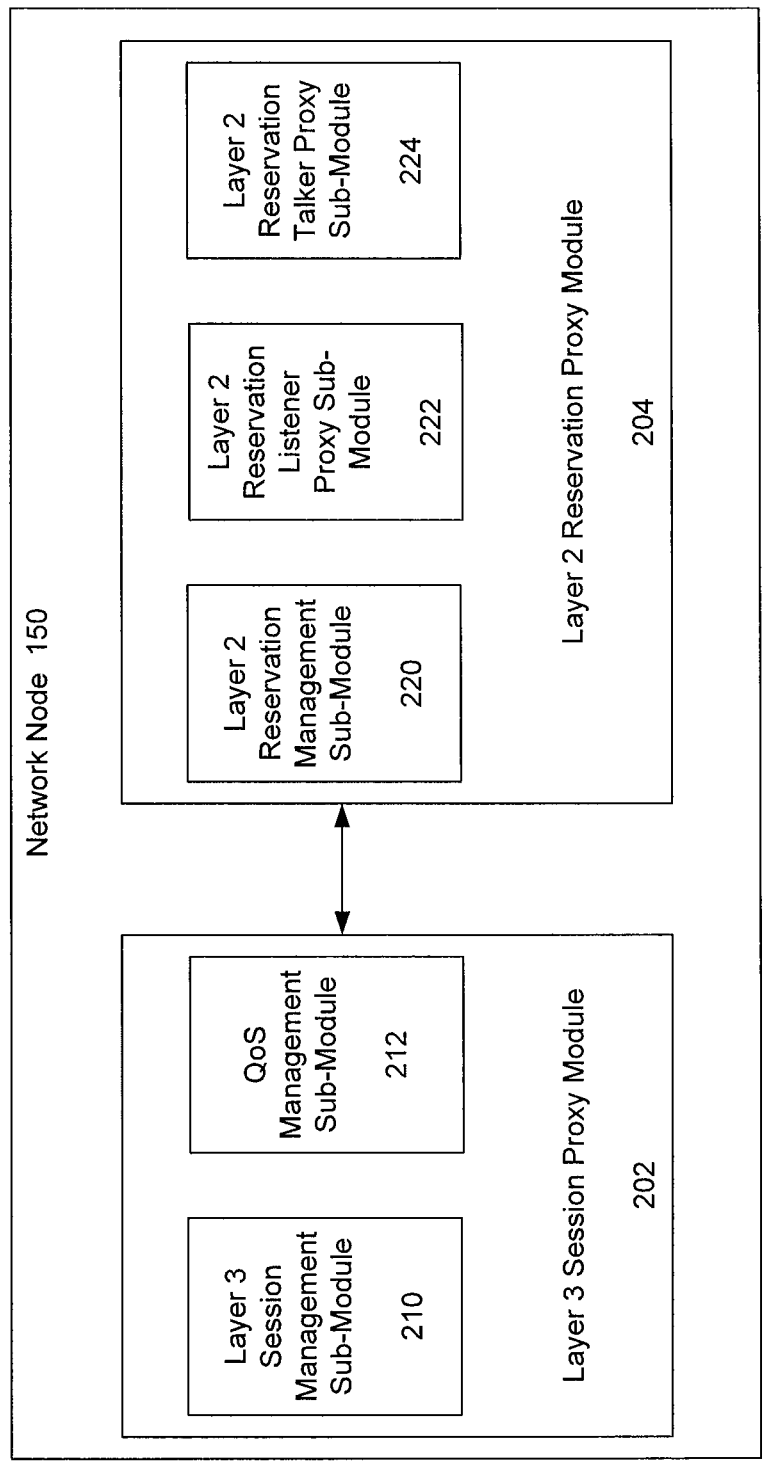
FIG. 2 is a block diagram of an example network node connected to different Layer 2 networks.

FIG. 2 shows a block diagram of an example configuration of the network node 150 configured to manage sessions and reservations for network paths between the talker 130 and the listener 140 shown in FIG. 1. The network node 150 may include a Layer 3 session proxy module 202 to create and terminate sessions in accordance with a Layer 3 session management protocol such as SIP, and to reserve and tear down network paths and guarantee quality of service in accordance with a Layer 2 reservation protocol, such as SRP, for transmission of data streams during the sessions.

The Layer 3 session proxy module 202 may be configured to manage communication of SIP messages and route information included in the SIP messages to other modules in the network node 150 for further processing. For example, the Layer 3 session proxy module 202 may be configured to identify information included in SIP messages for the reservations, and forward that information to the Layer 2 reservation module 204 so that the Layer 2 reservation proxy module 204 may reserve and tear down network paths. The Layer 3 session proxy module 202 may also receive reservation information from the Layer 2 reservation proxy module 204, which the Layer 3 session proxy module 202 may use to analyze or process SIP messages.

The Layer 2 reservation proxy module 204 may be configured to manage reservations in accordance with a Layer 2 reservation protocol. For example, the Layer 2 reservation proxy module may be configured to reserve network paths between the network node 150 and the talkers and listeners in the different Layer 2 networks in accordance with the Layer 2 reservation protocol. In addition, the Layer 2 reservation proxy module 204 may be configured to receive information for managing reservations from the Layer 3 session proxy module 202. The Layer 2 reservation proxy module 204 may also be configured to provide the Layer 3 session proxy module 202 with reservation information to use for analysis or processing of SIP messages.

In further detail, the Layer 3 session proxy module 202 may include a Layer 3 session management sub-module 210 and a QoS management sub-module 212. For creation of a session, the Layer 3 session management sub-module 210 may be configured to identify a received INVITE message identifying a data stream to be transmitted. The Layer 3 session management sub-module 210 may further be configured to determine whether the INVITE message identifies a QoS mechanism for the session, such as SRP or Resource Reservation Protocol (RSVP), as examples. If the Layer 3 session management sub-module 210 determines that that the INVITE message identifies a QoS mechanism, then the Layer 3 session management sub-module 210 may communicate that information to the QoS management sub-module 212 for further processing.

The QoS management sub-module 212 may be configured to identify the type of QoS mechanism that is specified in the INVITE message. The QoS management sub-module 212 may also be configured to determine QoS parameters, such as a requested bandwidth, that may be associated with the specified QoS mechanism and/or included in the INVITE message. If a Layer 2 reservation protocol is identified for the QoS mechanism, the QoS management sub-module 212 may forward the QoS parameters, such as the requested bandwidth, to the Layer 2 reservation proxy module 204. The QoS management sub-module 212 may forward other information included in the INVITE message, such as the stream ID, which may be used to reserve the network paths and/or the bandwidth for transmission of the data stream.

The Layer 2 reservation proxy module 204 may include a Layer 2 reservation management sub-module 220, a Layer 2 reservation talker sub-module 222, and a Layer 2 reservation listener sub-module 224. The Layer 2 reservation management sub-module 220 may be configured to receive the QoS parameters, including the requested bandwidth, from the QoS management sub-module 212. In response, the Layer 2 reservation management sub-module 220 may be configured to determine whether the requested bandwidth is available for transmission of the data stream. The Layer 2 reservation management sub-module 220 may determine whether bandwidth is available between the talker 130 and the network node 150, between ingress and egress ports of the network node 150, and between the network node 150 and the listener 140. To make the determinations, the Layer 2 reservation management sub-module 220 may be configured to monitor or track data streams being communicated over the Layer 2 networks 110, 112, including the bandwidth being allocated for the communications. The Layer 2 reservation management sub-module 220 may maintain or manage a database or a listing of the data stream communications, which may be used to determine whether bandwidth is available.

If the Layer 2 reservation management sub-module 220 determines that the requested bandwidth is unavailable, then the Layer 2 reservation management sub-module 220 may update the database. In addition or alternatively, the Layer 2 reservation sub-module may notify the Layer 3 session proxy module 202 that the requested bandwidth is unavailable. Upon notification, the Layer 3 session proxy module 202 may analyze received SIP messages using the information that bandwidth is unavailable.

Alternatively, if the Layer 2 reservation management sub-module 220 determines that the requested bandwidth is available, then the Layer 2 reservation manager sub-module 220 may be configured to notify the Layer 2 reservation talker and listener sub-modules 222, 224 that sufficient bandwidth is available for transmission of the data stream. The Layer 2 reservation sub-module 222 may also provide the Layer 2 reservation talker and listener sub-modules 222, 224 with information to reserve the network paths and/or the bandwidth for communication of the data stream, including the stream ID associated with the data stream and/or the amount of bandwidth requested.

The Layer 2 reservation listener proxy sub-module 222 may be configured to reserve a network path for communication of the data stream between the talker 130 and the network node 150. To reserve the network path between the talker 130 and the network node 150, the Layer 2 reservation listener proxy sub-module 222 may be configured to perform the role of a listener in accordance with the Layer 2 reservation protocol.

To reserve the network path between the talker 130 and the network node 150, the Layer 2 reservation listener proxy sub-module 222 may be configured to reserve the requested bandwidth for communication of the data stream from the talker 130. By reserving the requested bandwidth, the Layer 2 reservation listener proxy sub-module 222 may guarantee that the requested bandwidth is made available by the network node 150 for receipt of the data stream from the talker 130. The Layer 2 reservation listener proxy sub-module 222 may also associate the stream ID included in the INVITE message with the bandwidth reservation.

In addition, to reserve the network path between the talker 130 and the network node 150, the Layer 2 reservation listener proxy sub-module 222 may be configured to register listener attributes associated with the reservation. To register the listener attributes, the Layer 2 reservation listener proxy sub-module 222 may generate a Layer 2 listener message that the network node 150 may send to the talker 130.

Following registration, the Layer 2 reservation listener proxy sub-module 222 may be configured to wait for a Layer 2 advertisement message from the talker 130 to determine whether the reservation of the network path may be completed between the network node 150 and the talker 130. For example, if the Layer 2 reservation listener proxy sub-module 222 identifies that a Layer 2 advertisement message is received from the talker 130, then the Layer 2 reservation listener proxy sub-module 222 may determine that a reservation may be completed between the network node 150 and the talker 130. Alternatively, if the Layer 2 reservation listener proxy sub-module 222 identifies that a Layer 2 failed message is received, then the Layer 2 reservation listener proxy sub-module 222 may determine that a reservation may not be completed. For some example configurations, the Layer 2 reservation listener proxy sub-module 222 may be configured to wait in accordance with a predetermined timeout period. If the timeout period expires, then Layer 2 reservation listener proxy sub-module 222 may be configured to notify the Layer 2 reservation management sub-module 220 that the reservation may not be completed.

The Layer 2 reservation talker proxy sub-module 224 may be configured to reserve a network path for communication of the data stream between the network node 150 and the listener 140. To reserve the network path between the network node 150 and the listener 140, the Layer 2 reservation talker proxy sub-module 224 may be configured to perform the role of a talker in accordance with the Layer 2 reservation protocol.

To reserve the network path between the network node 150 and the listener 140, the Layer 2 reservation talker proxy sub-module 224 may be configured to reserve the requested bandwidth for communication of the data stream to the listener 140. By reserving the requested bandwidth, the Layer 2 reservation talker proxy sub-module 224 may guarantee that the requested bandwidth is made available by the network node 150 for transmission of the data stream to the listener 140. The Layer 2 reservation talker proxy sub-module 224 may also associate the stream ID included in the INVITE message with the bandwidth reservation.

In addition, to reserve the network path between the network node 150 and the listener 140, the Layer 2 reservation talker proxy sub-module 224 may be configured to register talker attributes associated with the reservation. To register the talker attributes, the Layer 2 reservation talker proxy sub-module 224 may generate a Layer 2 advertisement message that the network node 150 may send to the listener 140.

Following registration, the Layer 2 reservation talker proxy sub-module 224 may be configured to wait for a Layer 2 ready message from the listener 140 to determine whether the reservation of the network path may be completed between the network node 150 and the listener 140. For example, if the Layer 2 reservation talker proxy sub-module 224 identifies that a Layer 2 ready message is received from the listener 140, then the Layer 2 reservation talker proxy sub-module 224 may determine that a reservation may be completed between the network node 150 and the listener 140. Alternatively, if the Layer 2 reservation talker proxy sub-module 224 identifies that a Layer 2 failed message is received, then the Layer 2 reservation talker proxy sub-module 224 may determine that a reservation may not be completed. For some example configurations, the Layer 2 reservation talker proxy sub-module 224 may be configured to wait in accordance with a predetermined timeout period. If the timeout period expires, then Layer 2 reservation talker proxy sub-module 224 may be configured to notify the Layer 2 reservation management sub-module 220 that the reservation may not be completed.

For some alternative situations, the Layer 2 reservation talker proxy sub-module 224 may be configured to reserve multiple network paths for multiple listeners, such as listeners 140, 141, that want to receive the data stream. For example, the Layer 2 reservation talker proxy sub-module 224 may be configured to reserve and guarantee the requested bandwidth for communication to the multiple listeners 140, 141. In addition, the Layer 2 reservation talker proxy sub-module 224 may be configured to to register talker attributes and/or generate Layer 2 advertisement messages for transmission to multiple listeners, such as listener 140, 141, that want to communicate with the talker 130. Additionally, the Layer 2 reservation talker proxy sub-module 222 may be configured to identify multiple Layer 2 ready messages received from the multiple listeners 140, 141. Where multiple listeners 140, 141 want to communicate with the talker 130, the Layer 2 reservation talker proxy sub-module 224 may be configured to not notify the Layer 2 reservation management sub-module 220 that the reservation is complete between the network node 150 and the multiple listeners 140, 141 until Layer 2 reservation ready messages are received from all of the multiple listeners 140, 141.

The Layer 2 reservation management sub-module 220 may be configured to notify the Layer 3 session proxy module 202, including the Layer 3 session management sub-module 210 and/or the QoS sub-module 212, whether the entire reservation is complete and/or whether the session may be created. The Layer 3 session proxy module 202 may use and/or analyze the information received from the Layer 2 reservation management sub-module 220 to determine whether the session may be created and/or for communication of SIP messages to create the session.

For termination of a session, the Layer 3 session management sub-module 210 may be configured to identify that a BYE message is received by the network node 150. The BYE message may identify the session that is to be terminated. The session may be identified by the stream ID included in the INVITE message and/or other identification associated with and/or corresponding to the stream ID. Upon identification of the BYE message, the Layer 3 session management sub-module 210 may be configured to send the session identification information to the QoS management sub-module 212. The QoS management sub-module 212 may identify that the session to be terminated is for a data stream for which a reservation was made using the Layer 2 reservation protocol. In response, the QoS management sub-module 212 may notify the Layer 2 reservation proxy module 204 of the termination of the session. In addition, the QoS management sub-module 212 may provide the session identification information to the Layer 2 proxy module 204.

Upon receipt of the notification and/or the session identification information by the Layer 2 reservation proxy module 204, the Layer 2 reservation listener proxy sub-module 222 may release the reservation for the network path between the talker 130 and the network node 150. In particular, the Layer 2 reservation listener proxy sub-module 222 may release the bandwidth reserved for communication of the data stream from the talker 130. In addition, the Layer 2 reservation listener sub-module 222 may deregister any listener attributes, such as by sending a Layer 2 termination message to the talker 130. After, the Layer 2 reservation listener proxy sub-module 222 may be configured to notify the Layer 2 management sub-module 220 that the reservation between the network node 150 and the talker 130 has been released.

Similarly, the Layer 2 reservation talker proxy sub-module 224 may release the reservation for the network path between the network node 150 and the listener 140. IN particular, the Layer 2 reservation talker proxy sub-module 224 may release the bandwidth reserved for communication of the data stream to the listener 140. In addition, the Layer 2 reservation listener sub-module 224 may deregister any talker attributes, such as by sending a Layer 2 termination message to the listener 140. After, the Layer 2 reservation talker proxy sub-module 224 may be configured to notify the Layer 2 management sub-module 220 that the reservation between the network node 150 and the listener 140 has been released.

In response to receipt by both the Layer 2 reservation listener proxy and talker proxy sub-modules 222, 224 that the reservations of the network paths have been released, the Layer 2 reservation management sub-module 220 may notify the Layer 3 session proxy module 202. The Layer 3 session proxy module 202 may use the information identifying that the reservations have been released to determine whether the session may be terminated and/or for communication of SIP messages to terminate the session.

In accordance with SIP, SIP messages other than INVITE messages and BYE messages may be communicated to create and terminate a session. For example, various messages, such as TRYING, SESSION PROGRESS, PRACK, UPDATE, ACK, and OK, messages may be communicate to acknowledge receipt of messages, to negotiate session parameters, and to approve or provide agreement that a session is created or terminated.

Figure 3:
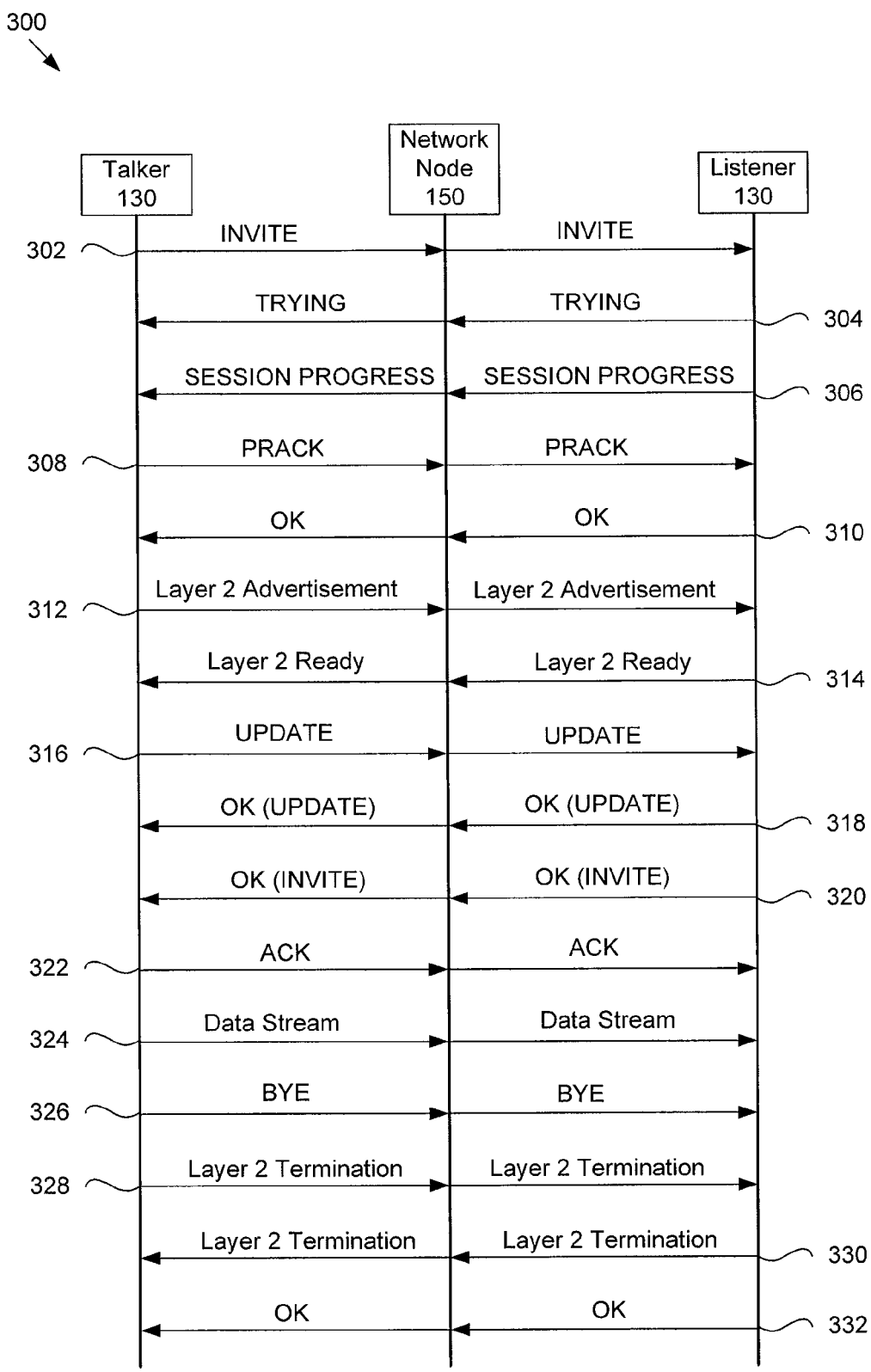
FIG. 3 is a routing diagram of an example method of creating and terminating a session.

FIG. 3 shows a routing diagram of an example method of communicating SIP messages and Layer 2 advertise, ready, and termination messages between the talker 130, the network node 150, and the listener 140 to create and terminate a session for communication of a data stream between the talker 130 and the listener 140. The method includes a plurality of communication events to create and terminate the session.

At event 302, the talker 130 may transmit an INVITE message to the network node 150, and the network node 150 may forward the INVITE message to the listener 140. The INVITE message may include session parameters for the session, including a stream ID, a requested bandwidth, and Layer 2 reservation protocol to reserve the network paths and establish quality of service for transmission of the data stream, as previously described.

Upon receipt of the INVITE message, the network node 150 may determine if sufficient bandwidth is available between the talker 130 and the listener 140, and communicate Layer 2 advertisement and ready messages to the talker 130 and the listener 140, as previously described. In addition, the network node 150 may communicate the INVITE message to the listener 140, which may indicate to the listener 140 that the talker 130 wants to create a session, the bandwidth requested, and the QoS mechanism that the talker 130 wants to use.

After the listener 140 receives the INVITE message, the listener 140, the network node 150, and the talker 130 may communicate a plurality of SIP messages to negotiate the session parameters and create the session. The communication of the SIP messages may be part of a negotiation process between the talker 130 and the listener 140 for the session parameters. The network node 150 may be an intermediate node between the talker 130 and the listener 140 that receives the SIP messages and forwards on the SIP messages to either the talker 130 or the listener 140. In addition, the network node 150 may analyze portions of the SIP messages in which the network node 150 may be interested. The network node 150 may further modify or change the portions in the SIP messages where appropriate. For example, if the talker 130 and the listener 140 communicate an SIP message to negotiate a QoS parameter such as bandwidth, the network node 150 may determine whether the network node 150 can handle the bandwidth before forwarding the SIP message to the talker 130 or the listener 140.

As part of the negotiation process, at event 304, the listener 140 may communicate a TRYING message to the talker 130 via the network node 150. The TRYING message may indicate that the listener 140 received the INVITE message and will attempt to create the session. At event 306, the listener 140 may communicate a SESSION PROGRESS message to the talker 130 via the network node 150. The SESSION PROGRESS message may indicate whether there listener 140 and/or the network node 150 is able to perform the reservation in accordance with the Layer 2 reservation protocol and/or the QoS mechanism identified in the INVITE message.

At event 308, the talker 130 may communicate a PRACK message to the listener 140 via the network node 150. The PRACK message may be a provisional acknowledgement identifying session parameters that the talker 130 believes to be the final session parameters. For some example negotiation processes, the talker 130 may communicate the PRACK message after receiving the SESSION PROGRESS message. In addition, the talker may communicate the PRACK message with or without having received a Layer 2 ready message from the network node 150. That is, the talker 130 may communicate the PRACK message without knowing that there is sufficient bandwidth to communicate the data stream as identified in the Layer 2 ready message. At event 310, the listener 140 may communicate an OK message to the talker 130 via the network node 150. The OK message may be an affirmative response to the PRACK message, indicating that the listener 140 and/or the network node 150 agrees with the session parameters indicated in the PRACK message.

At event 312, the talker 130 may communicate a Layer 2 advertisement message to the network node 150, and the network node 150 may communicate a Layer 2 advertisement message to the listener 140. The talker 130 may communicate the Layer 2 advertisement message to the network node 150 at the same time or substantially the same time that the talker 130 communicates the INVITE message. Alternatively, the talker 130 may communicate a Layer 2 advertisement message and the INVITE message at different times. The network node 150 may send the Layer 2 advertisement message to the listener 150 in response to receipt of the INVITE message and after a determination of sufficient bandwidth between the network node 150 and the talker 130 for transmission of the data stream.

At event 314, the listener 140 may communicate a Layer 2 ready message to the network node 150, and the network node 150 may communicate a Layer 2 ready message to the talker 130. The listener 140 may communicate the Layer 2 ready message in response to receipt of the Layer 2 advertisement message from the network node. Alternatively, the listener 140 may communicate the Layer 2 ready message independent or and/or without receipt of the Layer 2 advertisement message. The network node 150 may communicate the Layer 2 ready message to the talker 130 in response to receipt of the INVITE message and after a determination of sufficient bandwidth between the network node 150 and the listener 140 for transmission of the data stream.

At event 316, the talker 130 may communicate an UPDATE message to the listener 140 via the network node 150. The UPDATE message may indicate that the talker 130 identifies that negotiation of bandwidth and other QoS parameters is finalized. For some configurations, the UPDATE message is communicated after the talker 130 communicates the PRACK message. In addition, for some configurations, the talker 130 communicates the UPDATE message after receipt of a Layer 2 ready message from the network node 150. Alternatively, the UPDATE message may be communicated without receipt of a Layer 2 ready message from the network node 150.

At event 318, the listener 140 may communicate an OK message associated with the UPDATE message (identified as OK (UPDATE)) to the talker 130 via the network node 150, affirming the UPDATE message and its contents. The listener 140 may send the OK (UPDATE) message after a determination that bandwidth is reserved. For some configurations, the listener 140 may send the OK (UPDATE) message after receipt of a Layer 2 advertisement message from the network node 150. Alternatively, the OK (UPDATE) message may be communicated without receipt of a Layer 2 advertisement message from the network node 150. At event 320, the listener 140 may communicate an OK message associated with the INVITE message (identified as OK (INVITE)) to the talker 130, affirming that negotiation of session parameters is complete and creation of the session initially identified in the INVITE message may be finalized. At event 322, in response to receipt of the OK (UPDATE) and the OK (INVITE) messages, the talker 130 may send an ACK message to the listener 140 via the network node 150, indicating a final acknowledgement that the OK (UPDATE) and the OK (INVITE) messages are receives and that the session is created.

For some example configurations, the network node 150 may be configured to change or modify the OK (UPDATE) and/or the OK (INVITE) messages received from the listener 140 to a fail message in response to a determination that the reservation for bandwidth is not made or that there is insufficient bandwidth. For example, if the network node 150 receives a Layer 2 fail message from the talker 130 and/or the listener 140, or if a timeout period expires before receipt of a Layer 2 advertisement or ready message, the network node 150 may determine that a reservation may not be completed. In turn, in response to receipt of an OK (UPDATE) message or an OK (INVITE) message from the listener 140, the network node 150 may determine to withhold communication of the OK (UPDATE) or OK (INVITE) message to the talker 130, and/or to communicate a fail message to the talker 130 instead, which may prevent the session from being created.

At event 324, the talker 130 may communicate the data stream to the talker 140 via the network node 150 during the session. During the session, quality of service may be maintained from the talker 130 to the listener 140. For example, referring to FIG. 1, the Layer 2 bridges 160, 162 in the Layer 2 networks 110, 112 may guarantee quality of service, including bandwidth and priority, during the session. In addition, the network node 150, despite being configured for Layer 3, may enforce the negotiated quality of service parameters identified and established in accordance with the Layer 2 QoS mechanism (e.g. SRP).

When the session has ended, the talker 130, the listener 140, and the network node 150 may communicate SIP messages and Layer 2 termination messages in accordance with the Layer 2 reservation protocol to terminate the session. At event 326, the talker 130 may communicate a BYE message to the listener 140 via the network node 150, indicating that the session has ended. In response to the BYE message, the network node 150 may release the reserved bandwidth between the network node 150 and the talker 130 and the listener 140. In addition, the network node 150 may forward the BYE message to the listener 140.

At event 328, the talker 130 may communicate a Layer 2 termination message to the network node 150, and the network node 150 may communicate a Layer 2 termination message to the listener 140. For some configurations, the talker 130 may communicate the Layer 2 termination message and the BYE message at the same time or substantially the same time. In alternative configurations, the talker 130 may communicate the Layer 2 termination message and the BYE message at different times. The network node 150 may communicate a Layer 2 termination message to the listener 140 in response to receipt of the BYE message as part of a talker attribute deregistration process, as previously described.

At event 330, the listener 140 may communicate a Layer 2 termination message to the network node 150, and the network node 150 may communicate a Layer 2 termination message to the talker 130. The listener 140 may communicate the Layer 2 termination message in response to receipt of at least one of the BYE message or the Layer 2 termination message received from the network node 150. The network node 150 may communicate the Layer 2 termination message to the talker 130 in response to receipt of the BYE message from the talker 130 as part of a listener attribute deregistration process, as previously described.

At event 332, The listener 140 may communicate an OK message, affirming that the session may be terminated. The listener 140 communicate the OK message after releasing and/or making available any session parameters or other resources associated with the session, including bandwidth and codec used for the session to release or tear down the reservation.

The communications described above with reference to FIGS. 1-3 are described for two Layer 2 networks 110, 112 being linked or connected together with a single network node 150. In alternative configurations, the network communication system more than two different in which multiple network nodes may link or connect the Layer 2 networks. As an example, an alternative network communication system that includes three Layer 2 networks may include two network nodes, a first network node connecting first and second Layer 2 networks, and a second network node connected second and third Layer 2 networks. The second network node may be configured similarly to the first network node so that network paths may be reserved for a session between a talker connected in a first Layer 2 network and a listener connected in a third Layer 2 network. Various configurations are possible.

In some example configurations, the session parameters may be initialized and/or negotiated in accordance with an initialization protocol or standard to initialize and/or negotiate the session parameters. The session parameters included in the SIP messages may be included, identified, and/or formatted in accordance with the initialization protocol. An example initialization protocol may be Session Description Protocol (SDP), although other standards or protocols may be used.

SDP may use SDP attributes to extend the core SDP protocol. In one example, Request for Comment (RFC) 5432 defines a SDP attribute for identification and/or selection of a QoS mechanism to reserve data paths for communication of data streams and/or enforce quality of service. In particular, RFC 5432 defines attributes "qos-mech-send" and "qos-mech-recv" to request a QoS type. QoS types identified under RFC 5432 may include RSVP and Next Steps in Signaling (NSIS). Under RFC 5432, media lines or 'm' lines may be used to define or determine a media type, such as audio or video as examples. In addition, under RFC 5432, attribute lines or 'a' lines may be used to define or determine one or more attributes, such as packet type (e.g., RTP), content (e.g., audio), and the QoS protocol (e.g., RSVP).

For some example configurations, RFC 5432 may be used or implemented to select SRP (or another the Layer 2 reservation protocol) as the QoS mechanism. In particular, the attribute or 'a' lines under RFC5432 may support SRP as the QoS mechanism by extending the "qos-mech" attribute to include SRP. The new attribute definition may include the following:

qos-mech="rsvp"/"nsis"/"srp"/extension-mech

By adding SRP to the "qos-mech" attribute, SDP may be used to negotiate SRP as the QoS mechanism. An example 'm' line and an example 'a' line requesting SRP as the QoS mechanism under RFC5432 may include:

m=audio 50000 RTP/AVP 0 a=qos-mech-send: srp

In addition to negotiating or selecting SRP as the QoS mechanism, an attribute may be defined and/or determined that communicates a stream ID and/or other SRP parameters of a Layer 2 (e.g., AVB) data stream from a talker to a listener.

An example definition for an attribute under RFC5432 that encapsulates a stream ID and/or other SRP parameters under RFC5432 may be:

Attribute=/srp-qos-attr
    srp-qos-attr="srp-qos" ":"
    srp-streamid srp-streamid=7(2HEXDIG "-"): HEXDIG Example 'm' and 'a' lines requesting SRP QoS with a StreamID of 0x0102030405060708 may include: m=audio 50000 RTP/AVP 0 a=qos-mech-send: srp
    a=srp-qos: 01-02-03-04-05-06-07-08

The above example 'm' lines and 'a' lines communicating a stream ID may determine and/or illustrate a minimum set of attributes to enable SIP to specify SRP as the QoS mechanism. Details of the SRP reservation may be communicated through the Talker Advertise (TA) message. Configurations that determine and/or communicate only the stream ID may reduce and/or minimize the complexity of the session and/or the functionality of the network node. However, in alternative example configurations, other and/or additional 'm' lines and/or 'a' lines may be used to determine and/or define details or information in addition to the stream ID related to an SRP reservation in SIP. Additional SDP attributes may be defined to communicate bandwidth information for a data stream during a negotiation. The bandwidth information may include a number of packets per second, a number of bytes per packet, a priority, and/or an emergency indication, as examples. The bandwidth information may be associated with and/or communicated using a SRP "tspec" as defined in AVB standards and protocols.

Referring back to FIG. 1, each of the talkers 130, 131, the listeners 140, 141, 142, and the network node 150 may include and/or communicate with a processor P configured to perform the above described functions. The processor P may be a general processor, a digital signal processor, a controller, a microcontroller, an application specific integrated circuit, a field programmable gate array, an analog circuit, a digital circuit, combinations thereof, or other now known or later developed processors. The processor P may be a single device, a plurality of devices, or a combination of devices, such as associated with a network or distributed processing. Any of various processing strategies may be used, such as multi-processing, multi-tasking, parallel processing, remote processing, or the like. The processor P may be responsive to and/or configured to execute instructions stored as part of software, hardware, integrated circuits, firmware, micro-code, or the like.

In addition, each of the talkers 130, 131, the listeners 140, 141, 142, and the network node 150 may include a memory M in communication with the processor P. The memory M may be non-transitory computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory M may be a single device or a combination of devices. The memory M may be adjacent to, part of, networked with and/or remove from the processor. Logic encoded in one or more tangible media for execution is defined as the instructions that are executable by the programmed processor P and that are provided on the computer-readable storage media, memories, or a combination thereof.

The memory M may be a computer readable storage media having stored therein data representing instructions executable by the programmed processor P. The memory M may store instructions for the processor P. The processor P may be programmed with and execute the instructions. The functions, acts, methods, or tasks illustrated in the figures or described herein may be performed by the programmed processor P executing the instructions stored in the memory M. The functions, acts, methods or tasks may be independent of the particular type of instructions set, storage media, processor or processing strategy and may be performed by software, hardware, integrated circuits, firmware, micro-code, and the like, operating alone or in combination. The instructions may be for implementing the processes, techniques, methods, or acts described herein.

Additionally, the talkers 130, 131, the listeners 140, 141, 142, and the network node 150 may include one or more interfaces (I/F) in communication with the processor P and the memory M, and that may be used to communicate information with each other over the network 110. For some example configurations of the communication system 100, the talkers 130, 131, the listeners 140, 141, 142, and the network node 150 may be configured as network devices configured to communicate over a network, such as an Ethernet Audio-Video Bridging (AVB) network or other vehicle network, as examples. For these configurations, the interface I/F may be a network interface and/or implemented in hardware, such as a hard-wired or wireless network interface. Alternatively, one or more of the interfaces I/F may be non-network I/F and/or some or all of the systems may communicate with each other over non-network connections. In addition or alternatively, the interface I/F may be a universal asynchronous receiver/transmitter (UART), a parallel digital interface, a software interface, Ethernet, or any combination of known or later developed software and hardware interfaces. Various configurations are possible.

In addition to being Layer 2 networks, the networks 110, 112 may be configured in various types or forms. As examples, the Layer 2 networks 110, 112 may include wide area networks (WAN), such as the Internet, local area networks (LAN); campus area networks; metropolitan area networks; or any other wireless and/or wireline networks that may allow for data communication. In addition or alternatively, the networks 110, 112 may be divided into sub-networks, which may allow access or restrict access to some or all the components, including the electronic devices 130, 131, 140, 141, 142 connected to the networks 110, 112. For some example configurations, the networks 110, 112 may be considered sub-networks of the network communication system 100. In addition or alternatively, the networks 110, 112 may be regarded as a public or private network and may include, for example, a virtual private network, an encryption, or any other security mechanism employed over the public Internet, or the like. Various other types forms of networks for the networks 110, 112 may be possible.

In addition, referring to FIG. 2, the modules and sub-modules, including the Layer 3 session proxy module 202, the Layer 2 reservation proxy module 204, the Layer 3 session management sub-module 210, the QoS management sub-module 212, the Layer 2 reservation management sub-module 220, the Layer 2 reservation listener proxy sub-module 222, and the Layer 2 reservation listener proxy sub-module 224, may be implemented in hardware or a combination of hardware and software. In addition, the modules and sub-modules 202, 204, 210, 121, 220, 222, 224 may be implemented using any of the above-described processor P, memory M, interface I/F, or combinations thereof. For example, the functions of the above-described modules 202, 204, 210, 212, 220, 222, 224 may be performed by at least one processor P. In addition or alternatively, the modules may include data representing instructions that are stored in the memory M and executable by at least one processor P. Various configurations are possible. In addition or alternatively, the modules and sub-modules 202, 204, 210, 121, 220, 222, 224 may each include one or more executable modules, at least some of which may be embodied in a computer readable storage medium as executable instructions. Accordingly, as described herein, the modules and sub-modules 202, 204, 210, 121, 220, 222, 224 are defined to be hardware executable by the processor P, such as a computer readable storage medium that may include instructions executable by the processor P, a field programmable gate array (FPGA), and/or various devices, components, circuits, gates, circuit boards, and the like that are executable, directed, and/or controlled for performance by the processor P.

While various embodiments of the description have been described, it will be apparent to those of ordinary skill in the art that many more embodiments and implementations are possible within the scope of the description. Accordingly, the description is not to be restricted except in light of the attached claims and their equivalents.

I claim:

1. A network node configured to manage a session in accordance with a Layer 3 session management protocol, the network node comprising:
    a plurality of modules configured to create and terminate a session for communication of a data stream between a talker connected to a first Layer 2 network and a listener connected to a second Layer 2 network, the first Layer 2 network being different from the second Layer 2 network and the plurality of modules executable by a processor and comprising:
    a Layer 3 session proxy module configured to:
        identify a Layer 3 session message received from the talker, the Layer 3 session message indicating that the talker is requesting to create the session, where the Layer 3 session message is communicated in accordance with the Layer 3 session management protocol; and
    a Layer 2 reservation proxy module configured to:
        in response to identification of the Layer 3 session message:
            reserve a first network path for communication of the data stream between the talker and the network node in accordance with a Layer 2 reservation protocol;
            reserve a second network path for communication of the data stream between the network node and the listener in accordance with the Layer 2 reservation protocol.

2. The network node of claim 1, where the Layer 3 session message comprises:
    a requested bandwidth at which to communicate the data stream and information identifying the Layer 2 reservation protocol, and where the Layer 2 reservation proxy module is configured to:
    reserve the first network path by a reservation of the requested bandwidth for communication of the data stream from the talker and a registration of one or more listener attributes in accordance with the Layer 2 reservation protocol; and
    reserve the second network path by a reservation of the requested bandwidth for communication of the data stream to the listener and a registration of one or more talker attributes in accordance with the Layer 2 reservation protocol.

3. The network node of claim 2, where the Layer 2 reservation proxy module is configured to:
    generate a Layer 2 ready message for communication to the talker to register the one or more listener attributes; and
    generate a Layer 2 advertisement message for communication to the listener to register the one or more talker attributes.

4. The network node of claim 3, where the Layer 3 session message further comprises a stream ID identifying the data stream, and where the Layer 2 reservation proxy module is configured to:
    include the stream ID in each of the Layer 2 advertisement message and the Layer 2 ready message.

5. The network node of claim 3, where the Layer 2 ready message comprises a first Layer 2 ready message, where the Layer 2 advertisement message comprises a first Layer 2 advertisement message, and where the Layer 2 reservation proxy module is further configured to:
    identify receipt of a second Layer 2 advertisement message by the network node, the second Layer 2 advertisement message being received from the talker;
    determine completion of the reservation of the first network path in response to identification of receipt of the second Layer 2 advertisement message;
    identify receipt of a second Layer 2 ready message by the network node, the second Layer 2 advertisement ready message being received from the listener; and
    identify completion of the reservation of the second network path in response to identification of receipt of the second Layer 2 ready message.

6. The network node of claim 5, where the Layer 3 session message comprises a first Layer 3 session message, and where the Layer 3 session proxy module is configured to:
    receive notification from the Layer 2 reservation proxy module that reservations of the first network path and the second path are complete; and
    in response to the notification, communicate a second Layer 3 session message to the talker, the second Layer 3 session message providing an indication for the session to begin.

7. The network node of claim 1, where the Layer 3 message comprises a first Layer 3 message, and where the Layer 3 session proxy module is further configured to:
    identify receipt of a second Layer 3 session message by the network node, the second Layer 3 session message indicating that the session has ended; and
    release the reservations of the first network path and the second network path in accordance with the Layer 2 reservation protocol.

8. The network node of claim 1, where the Layer 3 session management protocol comprises Session Initiation Protocol (SIP) and the Layer 3 session message comprises a SIP message, where the Layer 2 reservation protocol comprises Stream Reservation Protocol (SRP), and where the first and second Layer 2 networks each comprise an Audio-Video Bridging (AVB) network.

9. A network communication system comprising:
    a talker connected to a first Layer 2 network, the talker configured to:
        communicate a first Layer 3 session message to a network node, the first Layer 3 session message indicating that the talker is requesting to create a session for communication of a data stream to a listener connected to a second, different Layer 2 network, the Layer 3 session message being sent in accordance with a Layer 3 session management protocol;

communicate a Layer 2 advertisement message to the network node and a Layer 2 ready message from the network node in accordance with a Layer 2 reservation protocol to reserve a network path between the talker and the network node;

receive a second Layer 3 session message from the network node, the second Layer 3 session message indicating for the session to begin.

10. The network communication system of claim 9, where the first Layer 3 session message includes a stream ID identifying the data stream and information identifying the Layer 2 reservation protocol as a quality of service mechanism to use to reserve the network path between the talker and the listener.

11. The network communication system of claim 10, where the talker is configured to include the stream ID included in the first Layer 3 session in the Layer 2 advertisement message communicated to the network node.

12. The network communication system of claim 10, where the network path comprises a first network path, and where the information identifying the Layer 2 reservation protocol is included in the first Layer 2 session message for reservation of a second network path between the network node and the listener.

13. The network communication system of claim 9, where the talker is further configured to communicate a third Layer 3 session message, the third Layer 3 session message being communicated in response to the Layer 2 ready message communicated from the network node, the Layer 3 session message indicating that negotiation of a requested bandwidth for communication of the data stream during the session is finalized.

14. The network communication system of claim 9, where the Layer 2 advertisement message comprises a first Layer 2 advertisement message, where the Layer 2 ready message comprises a first Layer 2 ready message, where the network path comprises a first network path, and where the network communication further comprises the listener, the listener configured to:

receive the first Layer 3 session message from the network node;

communicate a second Layer 2 ready message to the network node and communicate a second Layer 2 advertisement message from the network node to reserve a second network path between the network node and the listener; and communicate the second Layer 3 session message to the network node indicating for the session to begin, the second Layer 3 session message being communicated to the network node in response to communication of the second Layer 3 ready message to the network node and the second Layer 3 advertisement message from the network node to reserve the second network path.

15. A network node configured to create a session in accordance with a Layer 3 session management protocol, the network node comprising:

receiving, with a network node, a first Layer 3 session message received from the talker, the first Layer 3 session message indicating that the talker is requesting to create the session and formatted in accordance with a Layer 3 session management protocol; and in response to receipt of the first Layer 3 session message:
reserving, with the network node, a first network path for communication of the data stream between the talker and the network node in accordance with a Layer 2 reservation protocol, the first network path connecting the network node to a first Layer 2 network;

reserving, with the network node, a second network path between the network node and a listener in accordance with the Layer 2 reservation protocol, the second network path connecting the network node to a second Layer 2 network, the second Layer 2 network being different from the first Layer 2 network; and sending, with the network node, a second Layer 3 session message in response to reserving the first and second network paths in accordance with the Layer 2 reservation protocol, the second Layer 3 session message providing an indication for the session to begin.

16. The method of claim 15, where the first Layer 3 session message comprises:

a requested bandwidth at which to communicate the data stream and information identifying the Layer 2 reservation protocol, where reserving the first network path comprises:

reserving, with the network node, the requested bandwidth for communication of the data stream from the talker; and;

sending, with the network node, a Layer 2 ready message to the talker in accordance with the Layer 2 reservation protocol; and where reserving the second network path comprises:

reserving, with the network node, the requested bandwidth for communication of the data stream to the listener; and sending, with the network node, a Layer 2 advertisement message to the listener in accordance with the Layer 2 reservation protocol.

17. The method of claim 16, where the first Layer 3 message further comprises a stream ID identifying the data stream, the method further comprising:

including, with the network node, the stream ID in each of the Layer 2 advertisement message sent to the listener and the Layer 2 advertisement message sent to the talker.

18. The method of claim 16, where the Layer 2 ready message comprises a first Layer 2 ready message, where the Layer 2 advertisement message comprises a first Layer 2 advertisement message, the method further comprising:

receiving, with the network node, a second Layer 2 advertisement message from the talker;

determining, with the network node, completion of the reservation of the first network path in response to receiving the second Layer 2 advertisement message;

receiving, with the network node, a second Layer 2 ready message from the listener; and determining, with the network node, completion of the reservation of the second network path in response to receiving the second Layer 2 ready message.

19. The method of claim 15, further comprising:

receiving a third Layer 3 session message from the talker, the third Layer 3 session message indicating that the session has ended; and in response to receiving the third Layer 3 session message, releasing the reservations of the first network path and the second network path in accordance with the Layer 2 reservation protocol.

20. The method of claim 19, where releasing the reservations of the first network path and the second network path comprises:

releasing reservations of the requested bandwidth for communication of the data stream from the talker and to the listener; and deregistering one or more talker attributes and one or more listener attributes in accordance with the Layer 2 reservation protocol.

* * * * *